United States Patent [19]
Zehavi

[11] Patent Number: 5,414,728
[45] Date of Patent: May 9, 1995

[54] METHOD AND APPARATUS FOR BIFURCATING SIGNAL TRANSMISSION OVER IN-PHASE AND QUADRATURE PHASE SPREAD SPECTRUM COMMUNICATION CHANNELS

[75] Inventor: Ephraim Zehavi, San Diego, Calif.

[73] Assignee: Qualcomm Incorporated, San Diego, Calif.

[21] Appl. No.: 146,645

[22] Filed: Nov. 1, 1993

[51] Int. Cl.$^6$ .............................................. H04K 1/00
[52] U.S. Cl. ...................................... 375/200; 380/34; 375/205
[58] Field of Search .............................. 375/1; 380/34

[56] References Cited

U.S. PATENT DOCUMENTS

| | | | |
|---|---|---|---|
| 5,103,459 | 4/1992 | Gilhousen et al. | 375/1 |
| 5,216,692 | 6/1993 | Ling | 375/1 |
| 5,235,614 | 8/1993 | Bruckert et al. | 375/1 |
| 5,297,161 | 3/1994 | Ling | 375/1 |

*Primary Examiner*—Tod R. Swann
*Attorney, Agent, or Firm*—Russell B. Miller

[57] ABSTRACT

An improved system and method for communicating information over in-phase (I) and quadrature phase (Q) communication channels in a spread spectrum communication system is disclosed herein. In an exemplary implementation, first and second information signals are respectively transmitted over the I and Q communication channels using direct sequence spread spectrum communication signals. In-phase pseudorandom noise ($PN_I$) and quadrature phase pseudorandom noise ($PN_Q$) signals of predetermined PN codes are used for spreading the first and second information signals, respectively. In particular, the $PN_I$ and $PN_Q$ signals are respectively combined with the first and second information signals and an orthogonal function signal to provide I-channel and Q-channel modulation signals. The I-channel and Q-channel modulation signals are used for modulating in-phase (I) and quadrature phase (Q) carrier signals for transmission to a receiver via the I and Q communication channels, respectively. In a preferred implementation the receiver is operative to produce an estimate of at least the first information signal on the basis of the I-channel and Q-channel modulated carrier signals received over the I and Q communication channels. The received I-channel and Q-channel modulated carrier signals are demodulated and despread, with the resultant sequences being correlated into in-phase (I) and quadrature phase (Q) projection signals. A phase rotator operates to provide an estimate of at least the first information signal based on the I and Q projection signals and a received pilot signal.

38 Claims, 8 Drawing Sheets

METHOD AND APPARATUS FOR BIFURCATING SIGNAL TRANSMISSION OVER IN-PHASE AND QUADRATURE PHASE SPREAD SPECTRUM COMMUNICATION CHANNELS

BACKGROUND OF THE INVENTION

I. Field of the Invention

The present invention relates to communication systems utilizing spread spectrum signals, and, more particularly, to a novel and improved method and apparatus for communicating information in a spread spectrum communication system.

II. Description of the Related Art

Communication systems have been developed to allow transmission of information signals from a source location to a physically distinct user destination. Both analog and digital methods have been used to transmit such information signals over communication channels linking the source and user locations. Digital methods tend to afford several advantages relative to analog techniques, including, for example, improved immunity to channel noise and interference, increased capacity, and improved security of communication through the use of encryption.

In transmitting an information signal from a source location over a communication channel, the information signal is first converted into a form suitable for efficient transmission over the channel. Conversion, or modulation, of the information signal involves varying a parameter of a carrier wave on the basis of the information signal in such a way that the spectrum of the resulting modulated carrier is confined within the channel bandwidth. At the user location the original message signal is replicated from a version of the modulated carrier received subsequent to propagation over the channel. Such replication is generally achieved by using an inverse of the modulation process employed by the source transmitter.

Modulation also facilitates multiplexing, i.e., the simultaneous transmission of several signals over a common channel. Multiplexed communication systems will generally include a plurality of remote subscriber units requiring intermittent service of relatively short duration rather than continuous access to the communication channel. Systems designed to enable communication over brief periods of time with a set of subscriber units have been termed multiple access communication systems.

A particular type of multiple access communication system is known as a spread spectrum system. In spread spectrum systems, the modulation technique utilized results in a spreading of the transmitted signal over a wide frequency band within the communication channel. One type of multiple access spread spectrum system is a code division multiple access (CDMA) modulation system. Other multiple access communication system techniques, such as time division multiple access (TDMA), frequency division multiple access (FDMA) and AM modulation schemes such as amplitude companded single sideband are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention.

In the above-referenced U.S. Pat. No. 4,901,307, a multiple access technique is disclosed where a large number of mobile telephone system users each having a transceiver communicate through satellite repeaters or terrestrial base stations using CDMA spread spectrum communication signals. In using CDMA communications, the frequency spectrum can be reused multiple times thus permitting an increase in system user capacity. The use of CDMA results in a much higher spectral efficiency than can be achieved using other multiple access techniques.

More particularly, communication in a CDMA system between a pair of locations is achieved by spreading each transmitted signal over the channel bandwidth by using a unique user spreading code. Specific transmitted signals are extracted from the communication channel by despreading the composite signal energy in the communication channel with the user spreading code associated with the transmitted signal to be extracted.

In particular spread spectrum communication systems it has been desired to allow various types of user channels (e.g., voice, facsimile, or high-speed data) to operate at different data rates. These systems have typically been designed to have channels operative at a nominal data rate, and also to have reduced data rate traffic channels for providing more traffic data capacity. However, increasing traffic capacity by using reduced data rate channels lengthens the time required for data transmission, and typically requires utilization of relatively complex data coders and decoders. Moreover, in certain spread spectrum communication systems there is also a need for increased data rate traffic channels allowing for transmission at data at rates higher than the nominal rate.

Accordingly, it is an object of the present invention to provide a CDMA spread spectrum communication system in which traffic channel capacity may be increased in the absence of a corresponding reduction in data rate. It is a further object of the invention to provide such a CDMA system in which communication channels are available for data transmission at higher than the nominal system rate.

SUMMARY OF THE INVENTION

The implementation of CDMA techniques in spread spectrum communication systems using orthogonal PN code sequences reduces mutual interference between users, thereby allowing higher capacity and better performance. The present invention provides an improved system and method for communicating information over in-phase (I) and quadrature phase (Q) communication channels in a CDMA spread spectrum communication system.

In an exemplary embodiment, first and second information signals are respectively transmitted over the I and Q communication channels using direct sequence spread spectrum communication signals. In-phase pseudorandom noise ($PN_I$) and quadrature phase pseudorandom noise ($PN_Q$) signals of predetermined PN codes are used for spreading the first and second information signals, respectively. In particular, the $PN_I$ signal is combined with the first information signal and an orthogonal function signal to provide an I-channel modulation signal. Similarly, the $PN_Q$ signal is combined with the second information signal and the orthogonal function signal to provide a Q-channel modulation signal. The I-channel and Q-channel modulation signals are used for modulating in-phase (I) and quadrature phase (Q) carrier signals for transmission to a receiver via the I and Q communication channels, respectively.

In the exemplary embodiment the receiver is operative to produce an estimate of at least the first information signal on the basis of the I-channel and Q-channel modulated carrier signals received over the I and Q communication channels. The received I-channel and Q-channel modulated carrier signals are demodulated into intermediate received signals using the orthogonal function signal. In particular, the intermediate received signals are decorrelated using a despreading $PN_I$ signal in order to provide a first set of in-phase (I) and quadrature phase (Q) projection signals. A phase rotator operates to provide an estimate of the first information signal based on the first set of I and Q projection signals and a received pilot signal.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
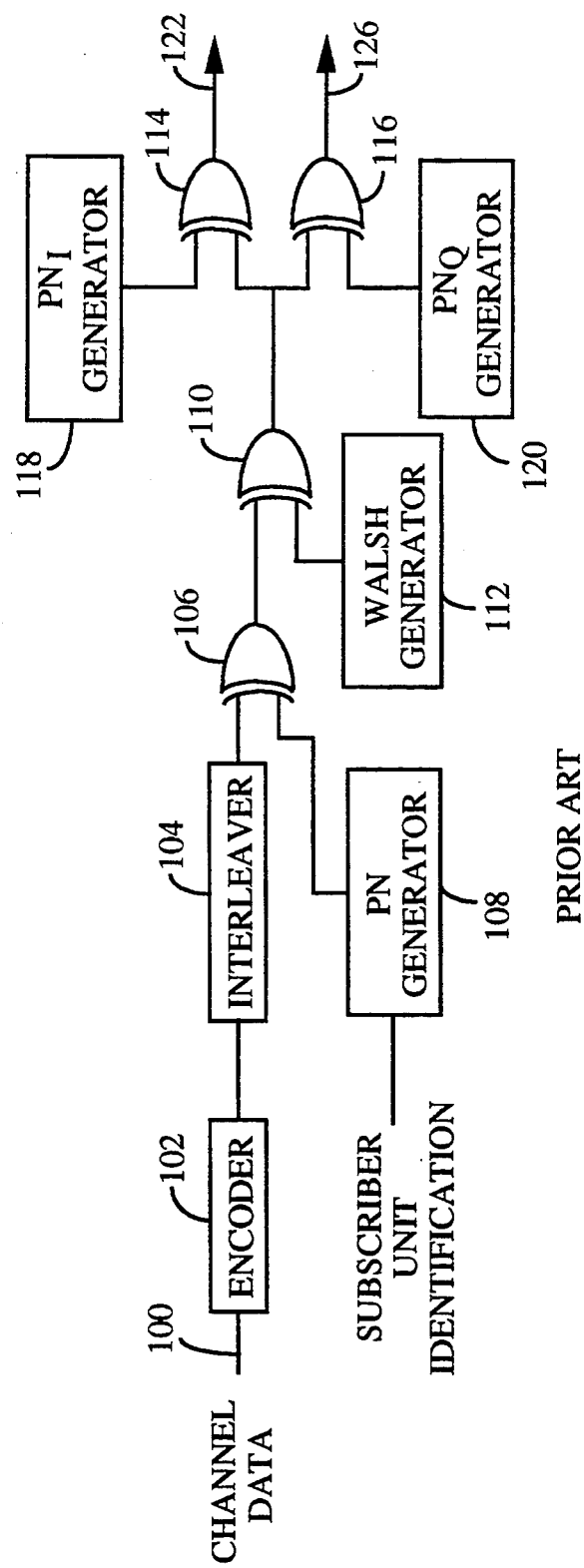
FIG. 1 shows a block diagram of a conventional spread spectrum transmitter.

Referring to FIG. 1, there is shown a spread spectrum transmitter such as is described in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", which is assigned to the assignee of the present invention, and which is herein incorporated by reference. In the transmitter of FIG. 1, data bits 100 consisting of, for example, voice converted to data by a vocoder, are supplied to an encoder 102 where the bits are convolutional encoded with code symbol repetition in accordance with the input data rate. When the data bit rate is less than the bit processing rate of the encoder 102, code symbol repetition dictates that encoder 102 repeat the input data bits 100 in order to create a repetitive data stream at a bit rate which matches the operative rate of encoder 102. The encoded data is then provided to interleaver 104 where it is block interleaved. The interleaved symbol data is output from interleaver 104 at an exemplary rate of 19.2 ksps to an input of exclusive-OR gate 106.

In the system of FIG. 1 the interleaved data symbols are scrambled to provide greater security in transmissions over the channel. Scrambling of the voice channel signals may be accomplished by pseudonoise (PN) coding the interleaved data with a PN code specific to an intended recipient subscriber unit. Such PN scrambling may be provided by the PN generator 108 using a suitable PN sequence or encryption scheme. The PN generator 108 will typically include a long PN generator for producing a unique PN code at a fixed rate of 1.2288 MHz. This PN code is then passed through a decimator, with the resulting 9.2 MHz scrambling sequence being supplied to the other input of exclusive-OR gate 106 in accordance with subscriber unit identification information provided thereto. The output of exclusive-OR gate 106 is then provided to one input of exclusive-OR gate 110.

Again referring to FIG. 1, the other input of exclusive-OR gate 110 is connected to a Walsh code generator 112. Walsh generator 112 generates a signal corresponding to the Walsh sequence assigned to the data channel over which information is being transmitted. The Walsh code provided by generator 112 is selected from a set of 64 Walsh codes of length 64. The 64 orthogonal codes correspond to Walsh codes from a 64 by 64 Hadamard matrix wherein a Walsh code is a single row or column of the matrix. The scrambled symbol data and Walsh code are exclusive-OR'ed by exclusive-OR gate 110 with the result provided as an input to both of the exclusive-OR gates 114 and 116.

Exclusive-OR gate 114 also receives a $PN_I$ signal from $PN_I$ generator 118, while the other input of exclusive-OR gate 116 receives a $PN_Q$ signal from $PN_Q$ generator 118. The $PN_I$ and $PN_Q$ signals are pseudorandom noise sequences typically corresponding to a particular area, i.e., cell, covered by the CDMA system and relate respectively to in-phase (I) and quadrature phase (Q) communication channels. The $PN_I$ and $PN_Q$ signals are respectively exclusive-OR'ed with the output of exclusive-OR gate 110 so as to further spread the user data prior to transmission. The resulting I-channel code spread sequence 122 and Q-channel code spread sequence 126 are used to bi-phase modulate a quadrature pair of sinusoids. The modulated sinusoids are summed, bandpass filtered, shifted to an RF frequency, and again filtered and amplified prior to being radiated via an antenna to complete transmission over the communication channel. Further details on the use of a pilot signal and multiple modulators is described in the above U.S. Pat. No. 5,103,459.

It is observed that in the transmission system of FIG. 1 the same information, i.e., the channel data 100, is conveyed over the communication channel at the nominal channel data rate by the I-channel code spread sequence 122 and the Q-channel code spread sequence 126. As is described hereinafter, the present invention provides a technique for transmitting a pair of distinct information signals at the nominal rate using the $PN_I$ code and the $PN_Q$ code, respectively. When distinct information signals are separately transmitted by each pair of I and Q communication channels, the number of channels within the spread spectrum system capable of operating at the nominal system data rate is effectively doubled. Alternatively, a given CDMA communication channel may be bifurcated into independent in-phase (I) and quadrature phase (Q) channels. This allows, for example, a single information signal to be transmitted at twice the nominal rate by dividing the signal between the I and Q channels. In a similar fashion to that which is disclosed in U.S. Pat. No. 5,103,459, a pilot signal may be combined with the multiple channel modulated data for transmission.

Figure 2:
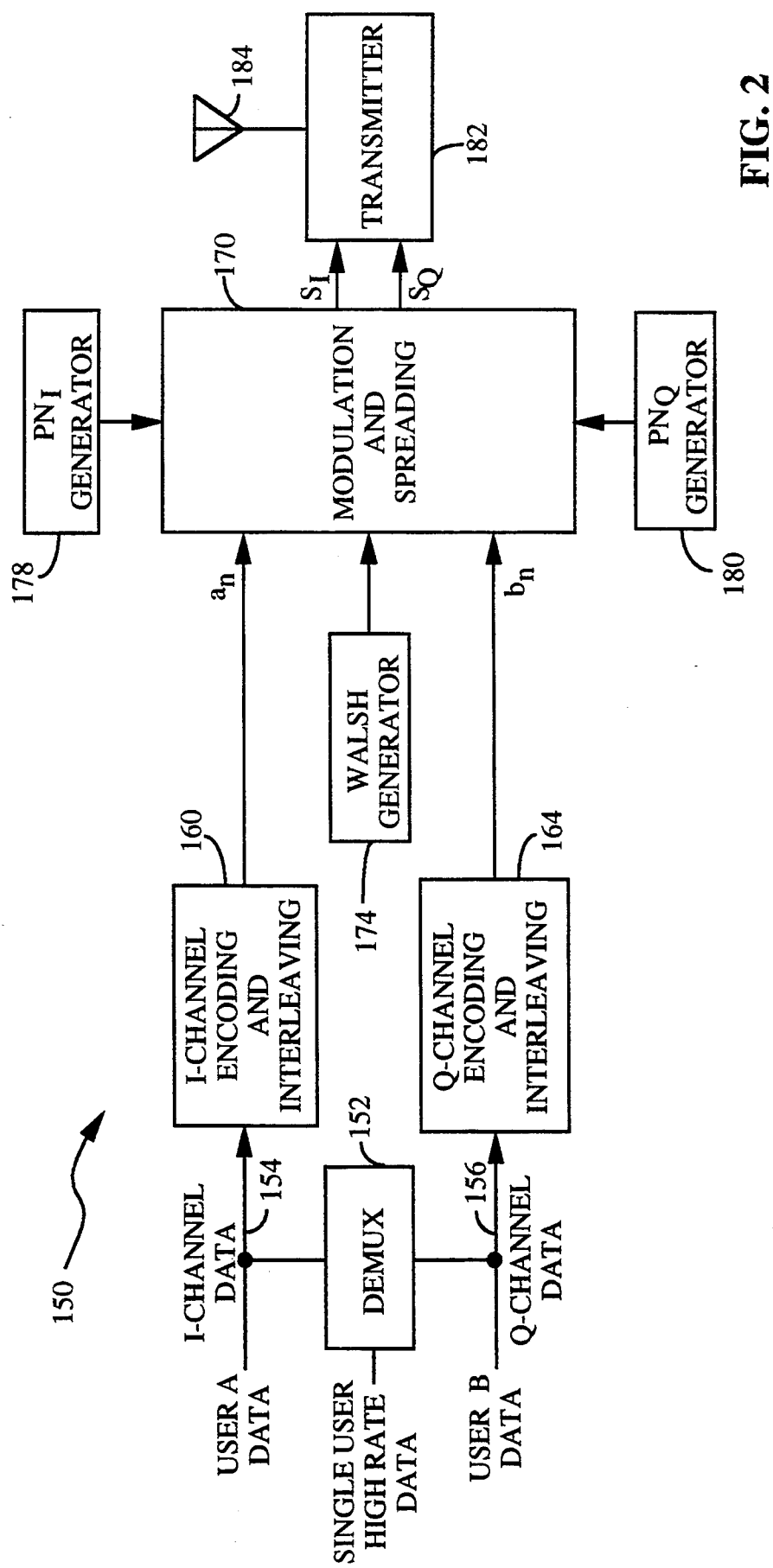
FIG. 2 shows a block diagram of a preferred embodiment of a spread spectrum transmitter disposed to transmit I-channel and Q-channel information signals in accordance with the invention.

FIG. 2 shows a block diagram of a preferred embodiment of a spread spectrum transmitter 150 disposed to transmit distinct I-channel 154 and Q-channel 156 information signals in accordance with the invention. For purposes of ease in illustration only a single channel pair is illustrated. It should be understood that in the transmission scheme the transmitter may included numerous copies of the circuit as disclosed in FIG. 2 for other user channels, in addition to a pilot channel. As is described below, the I-channel and Q-channel information signals are provided over I and Q communication channels utilizing RF carrier signals of the same frequency transmitted in phase quadrature. In an exemplary implementation one-half of a total number of system users receive information exclusively over the I-channel, while the remaining users receive information exclusively over the Q-channel. Alternatively, in a high data rate implementation each user receives an I-channel and a Q-channel information signal modulated by an identical Walsh code. In this way one-half of the data comprising a single information signal may be transmitted over each of the I and Q channels, thereby allowing for data transmission at twice the nominal rate.

In particular applications the information signals 154 and 156 may consist of, for example, voice converted to a stream of data bits by a vocoder or other digital data. Information signals 154 and 156 may be individual user channel signals (e.g. User A data and User B data) or a single high rate data channel signal that is demultiplexed by demultiplexer 152 into the two data streams. The data streams are then respectively supplied to a pair of encoding and interleaving networks 160 and 164. The networks 160 and 164 convolutional encode the information signals 154 and 156, and interleave with code symbol repetition in accordance with the input data rate. In the absence of code symbol repetition the networks 160 and 164 operate at a nominal rate of, for example, 9.6 kbit/s. When the input data bit rates (e.g., 4.8 kbit/s) of the information signals are lower than this nominal rate, the bits comprising the information signals 154 and 156 are repeated in order to create a repetitive data stream at a rate identical to the nominal symbol rate (e.g. 9.6 kbit/s). The encoded data is then interleaved and output from the networks 160 and 164 as encoded and interleaved symbol streams $a_n$ and $b_n$.

The streams of symbols $a_n$ and $b_n$, respectively corresponding to convolutional encoded and interleaved versions of the sampled I-channel 154 and Q-channel 156 information signals, are supplied to a modulation and spreading network 170. The network 170 operates to modulate the symbol streams $a_n$ and $b_n$ with a signal supplied by a Walsh generator 174. In the preferred embodiment, the signal provided by Walsh generator 174 consists of a Walsh code sequence assigned to the particular pair of I and Q communication channels over which the $a_n$ and $b_n$ symbol streams are transmitted. For an exemplary data rate of 9.6 kbit/s, the Walsh sequence provided by generator 174 will typically be selected from a set of 64 orthogonal Walsh codes of length 64.

In the preferred embodiment the chip rate of the Walsh sequences is chosen to be 1.2288 MHz. In this regard it is desirable that the chip rate be exactly divisible by the baseband data rates to be used in the system. It is also desirable for the divisor to be a power of two. Assuming at least one user channel operating at a nominal baseband data rate of 9600 bits per second results in an exemplary Walsh chip rate of 1.2288 MHz, i.e., 128×9600.

As is indicated by FIG. 2 the modulation and spreading network 170 is further provided with $PN_I$ and $PN_Q$ spreading signals by $PN_I$ and $PN_Q$ sequence generators 178 and 180. The $PN_I$ sequence is related to the I communication channel and is used within the network 170 to spread the $a_n$ symbol stream into an I-channel code spread sequence $S_I$. Similarly the $PN_Q$ sequence is utilized by the network 170 to spread the $b_n$ symbol stream prior to transmission as a Q-channel code spread sequence $S_Q$ over the Q communication channel. The resultant I-channel and Q-channel code spread sequences $S_I$ and $S_Q$ are used to bi-phase modulate a quadrature pair of sinusoids generated within an RF transmitter 182. In RF transmitter 182 the modulated sinusoids will generally be summed, bandpass filtered, shifted from a basesband frequency to IF frequency to an RF frequency, and amplified at various frequency stages prior to being radiated via an antenna 184 to complete transmission over the I and Q communication channels.

Assuming the transmitter 150 to be the $i^{th}$ of N such transmitters, where i=1, ... N, the I-channel and Q-channel spread sequences $S_I(i)$ and $S_Q(i)$ produced thereby may be represented as:

$$S_I(i) = a_n(i) W_i PN_I \qquad (1)$$

and, $$S_Q(i) = b_n(i) W_i PN_Q \qquad (2)$$

where $W_i$ denotes the Walsh sequence provided by the Walsh generator 174.

Figure 3:
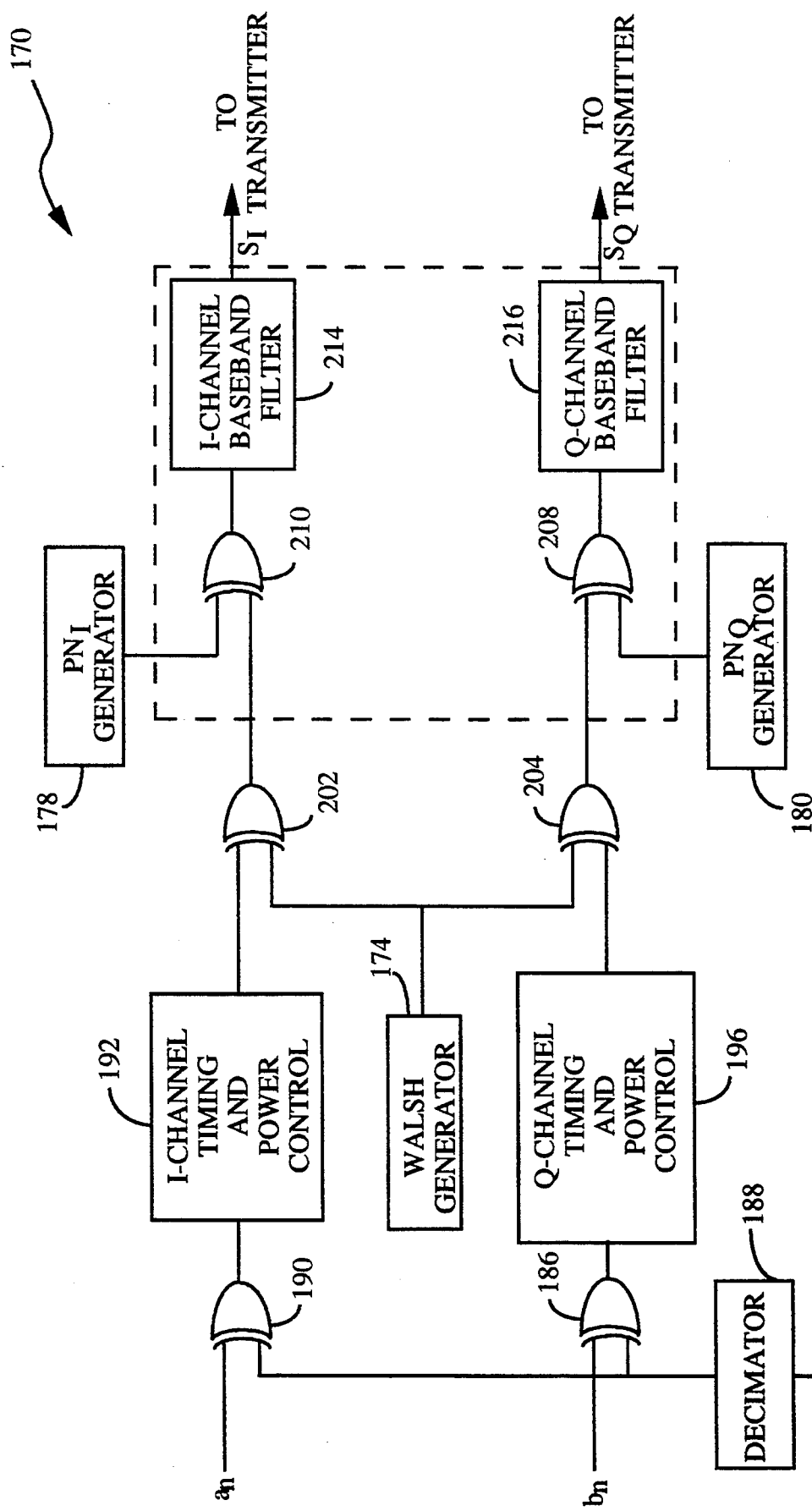
FIG. 3 provides a more detailed representation of the modulation and spreading network included within a preferred embodiment of the spread spectrum transmitter.

Referring to FIG. 3 there is shown a more detailed representation of the modulation and spreading network 170. The network 170 optionally includes a long PN code sequence generator 184 operative at a fixed chip rate of 1.228 Mchip/s and a decimator 188 for providing a scrambling code at an exemplary rate of 19.2 ksps. PN generator 184 is responsive to an code select input for generating the desired code. PN generator 184 typically provides code sequences in length on the order of $2^{42}-1$ chips, although codes of other lengths may be employed. Although not necessary to distinguish the information transmitted over companion I and Q communication channels the long PN scrambling sequences may be used to enhance communication security. In the case where a single user high rate data is to be transmitted over both the I and Q channels the same PN code sequence is the same. However, in the case where the I and Q channnels are assigned to different users, the long PN scrambling code are preferrably different e.g. either different code sequences are used or the same code sequence but of different code phase offsets (a delayed or advanced code sequence). PN generator 184 is capable of producing such code sequences as is well known in the art. In the multiple access case where multiple copies of the circuit of FIG.

3 are implemented, the scrambling codes assigned to each of the user channels are different, either by different codes but preferrably of the same code but of different code phase offsets.

Exclusive-OR gates 186 and 190 may be employed to utilize the unique scrambling codes produced by the long PN generator 184 and provided via decimator 188 to scramble the $a_n$ and $b_n$ symbol streams prior to forwarding to an I-channel power control and timing circuit 192, and to a Q-channel power control and timing circuit 196. The circuits 192 and 196 allow control to be exercised over signal transmissions from users of the I and Q communication channels by multiplexing power control and timing information bits into the $a_n$ and $b_n$ symbol streams. The multiplexed symbol streams produced by the I-channel and Q-channel timing and power control circuits 192 and 196 are provided to inputs of exclusive-OR combiners 202 and 204, respectively.

As shown in FIG. 3, the other inputs of exclusive-OR combiners 202 and 204 are provided with a signal corresponding to the preassigned Walsh sequence generated by Walsh generator 174. The symbol streams from the I-channel and Q-channel circuits 192 and 196 are exclusive-OR'ed with the Walsh sequence by the exclusive-OR gates 202 and 204, with the resultant bit streams being respectively provided as inputs to exclusive-OR gates 208 and 210. Exclusive-OR gate 210 also receives the $PN_I$ signal, while the remaining input of exclusive-OR gate 208 receives the $PN_Q$ signal. The $PN_I$ and $PN_Q$ signals are respectively exclusive-OR'ed with the output of exclusive-OR gates 202 and 204, and are provided as inputs to I-channel and Q-channel baseband filters 214 and 216. In an exemplary embodiment the baseband filters 214 and 216 are designed to have a normalized frequency response S(f) confined to between $\pm \delta_1$ in the passband $0 \leq f \leq f_p$, and which is less than or equal to $-\delta_2$ in the stop band $f \geq f_s$. In the exemplary embodiment $\delta_1 = 1.5$ dB, $\delta_2 = 40$ dB, $f_p = 590$ kHz, and $f_s = 740$ kHz. As is indicated by FIG. 3, the baseband filters 214 and 216 produce the I-channel and Q-channel spread sequences $S_I$ and $S_Q$. The filtered signals from the I-channel and Q-channel baseband filters 214 and 216 are provided to the RF transmitter 182.

In the preferred embodiment, a pilot channel containing no data modulation is transmitted together with the I-channel and Q-channel spread sequences $S_I$ and $S_Q$. The pilot channel may be characterized as an unmodulated spread spectrum signal used for signal acquisition and tracking purposes. In systems incorporating a plurality of transmitters in accordance with the invention, the set of communication channels provided be each will be identified by a unique pilot signal. However, rather than using a separate set of PN generators for the pilot signals, it is realized that a more efficient approach to generating a set of pilot signals is to use shifts in the same basic sequence. Utilizing this technique an intended receiver unit sequentially searches the whole pilot sequence and tunes to the offset or shift that produces the strongest correlation.

Accordingly, the pilot sequence will preferably be long enough that many different sequences can be generated by shifts in the basic sequence to support a large number of pilot signals in the system. In addition, the separation or shifts must be great enough to ensure that there is no interference in the pilot signals. Hence, in an exemplary embodiment the pilot sequence length is chosen to be $2^{15}$, which allows for 512 distinct pilot signals with offsets in a basic sequence of 64 chips.

Figure 4:
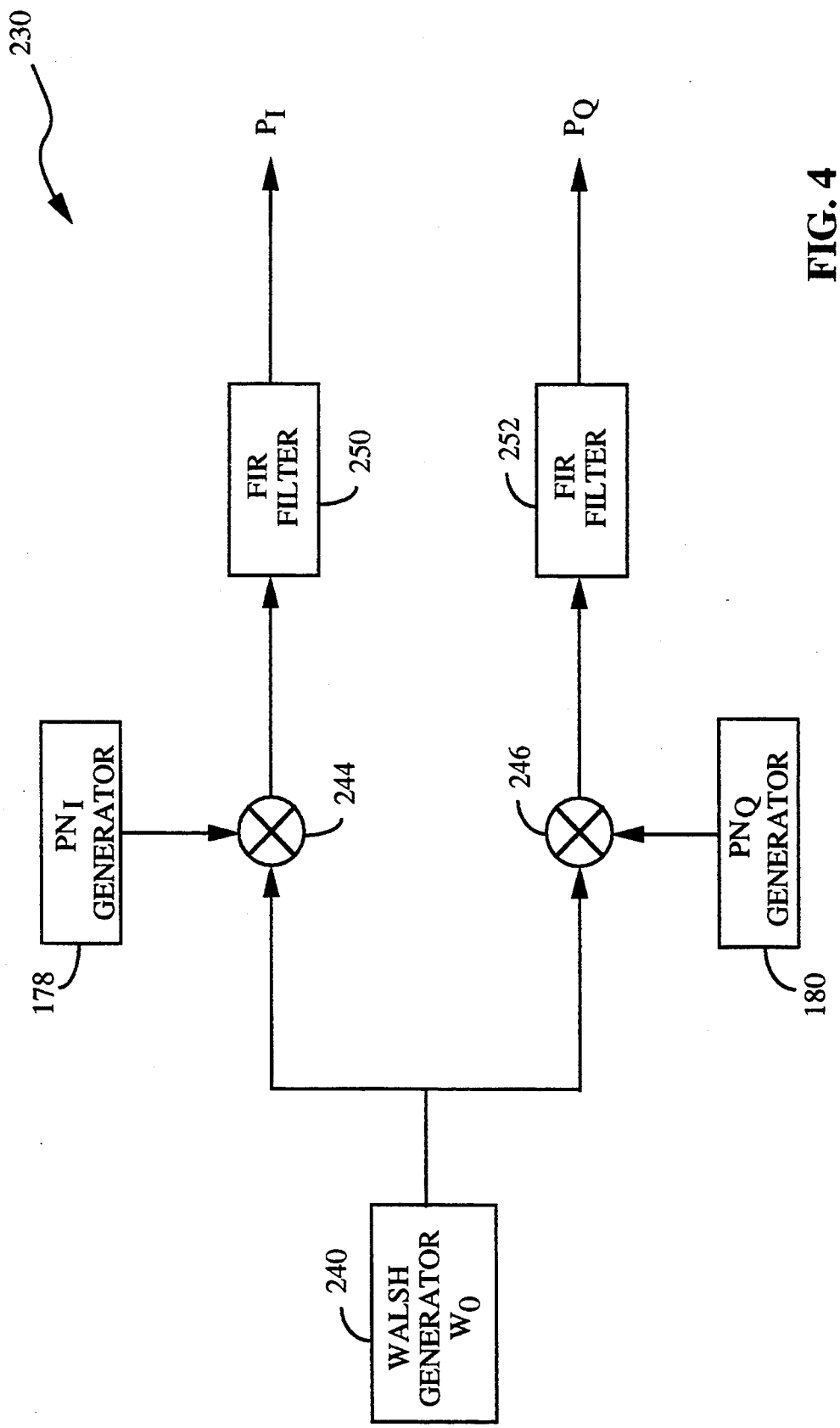
FIG. 4 depicts a pilot generation network for providing I and Q channel pilot sequences.

Referring to FIG. 4, a pilot generation network 230 includes a Walsh generator 240 for providing the Walsh "zero" $W_0$ sequence consisting of all zeroes to exclusive-OR gates 244 and 246. The Walsh sequence $W_0$ is multiplied by the $PN_I$ and $PN_Q$ sequences using the exclusive-OR gates 244 and 246, respectively. Since the sequence $W_0$ includes only zeroes, the information content of the resultant sequences depends only upon the $PN_I$ and $PN_Q$ sequences. Therefore in an alternative embodiment exclusive-OR gates 244 and 246 need not be present with the $PN_I$ and $PN_Q$ sequences provided directly The sequences produced by exclusive-OR gates 244 and 246 are provided as inputs to Finite Impulse Response Filters (FIR) filters 250 and 252. The filtered sequences output from FIR filters 250 and 252, respectively corresponding to I-channel and Q-channel pilot sequences $P_I$ and $P_Q$, are supplied to the RF transmitter 182.

It should be noted that since the sequence $W_0$ includes only zeroes as previously mentioned in an alternative embodiment exclusive-OR combiners 244 and 246 need not be present with the $PN_I$ and $PN_Q$ sequences provided directly to FIR filters 250 and 252.

Figure 5:
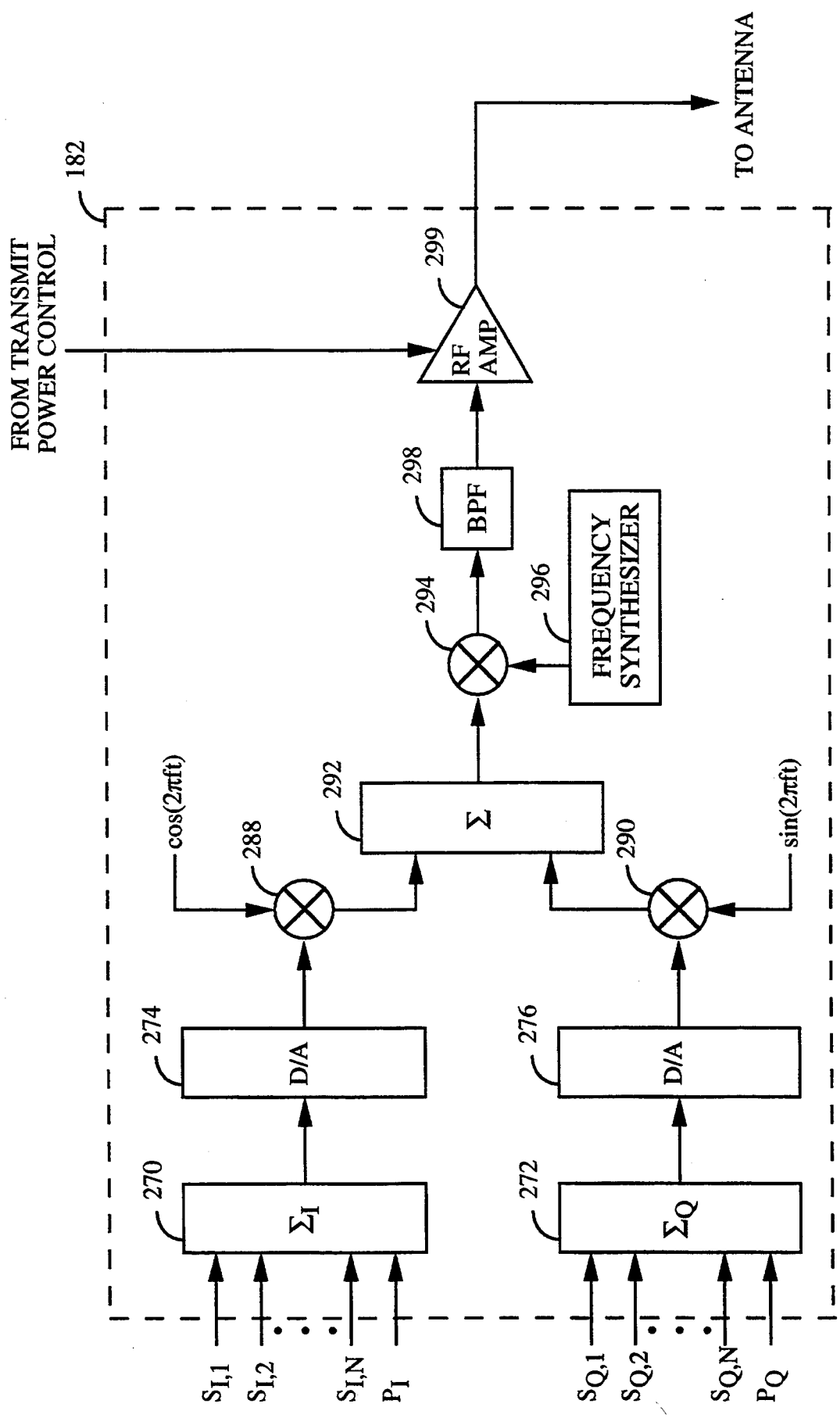
FIG. 5 shows an exemplary implementation of an RF transmitter incorporated within a preferred embodiment of the invention.

Referring to FIG. 5, there is shown an exemplary implementation of the RF transmitter 182. Transmitter 182 includes an I-channel summer 270 for summing the $PN_I$ spread data signals $S_{Ii}$, i=1 to N, with the I-channel pilot $P_I$. Similarly, a Q-channel summer 272 serves to combine the $PN_Q$ spread data signals $S_{Qi}$, i=1 to N, with the Q-channel pilot $P_Q$. Digital to analog (D/A) converters 274 and 276 are provided for converting the digital information from the I-channel and Q-channel summers 270 and 272, respectively, into analog form. The analog waveforms produced by D/A converters 274 and 276 are provided along with local oscillator (LO) carrier frequency signals Cos(2 $\pi$ft) and Sin(2 $\pi$ft), respectively, to mixers 288 and 290 where they are mixed and provided to summer 292. The quadrature phase carrier signals Sin(2 $\pi$ft) and Cos(2 $\pi$ft) are provided from suitable frequency sources (not shown). These mixed IF signals are summed in summer 292 and provided to mixer 294.

Mixer 294 mixes the summed signal with an RF frequency signal from frequency synthesizer 296 so as to provide frequency upconversion to the RF frequency band. The RF signal includes in-phase (I) and quadrature phase (Q) components, and is bandpass filtered by bandpass filter 298 and output to RF amplifier 299. Amplifier 299 amplifies the band limited signal in accordance with an input gain control signal from transmit power control circuitry (not shown). It should be understood that differing implementations of the RF transmitter 182 may employ a variety of signal summing, mixing, filtering and amplification techniques not described herein, but which are well known to those in the art.

Table I below sets forth in summary form the values of the modulation parameters corresponding to data transmission at the exemplary rates of 1.2, 2.4, 4.8, 9.6 and 19.2 kbps.

TABLE I

| Parameter | Data Rate | | | | | Units |
|---|---|---|---|---|---|---|
| | 19200 | 9600 | 4800 | 2400 | 1200 | |
| PN Chip Rate | 1.2288 | 1.2288 | 1.2288 | 1.2288 | 1.2288 | Mcps |
| Code Rate | ½ | ½ | ½ | ½ | ½ | Bits/Code Symbol |
| Number of I and Q Channels for Supporting Data Rate | 2 | 1 | 1 | 1 | 1 | 2 = I and Q<br>1 = I or Q |
| Code Repetition | 1 | 1 | 2 | 4 | 8 | |
| Modulation Symbol Rate | 19,200 | 19,200 | 19,200 | 19,200 | 19,200 | Sps |
| PN Chips/Modulation Symbol | 64 | 64 | 64 | 64 | 64 | PN Chips/Modulation Symbol |
| PN Chips/Bit | 128 | 128 | 256 | 512 | 1024 | PN Chips/Bit |

Figure 6:
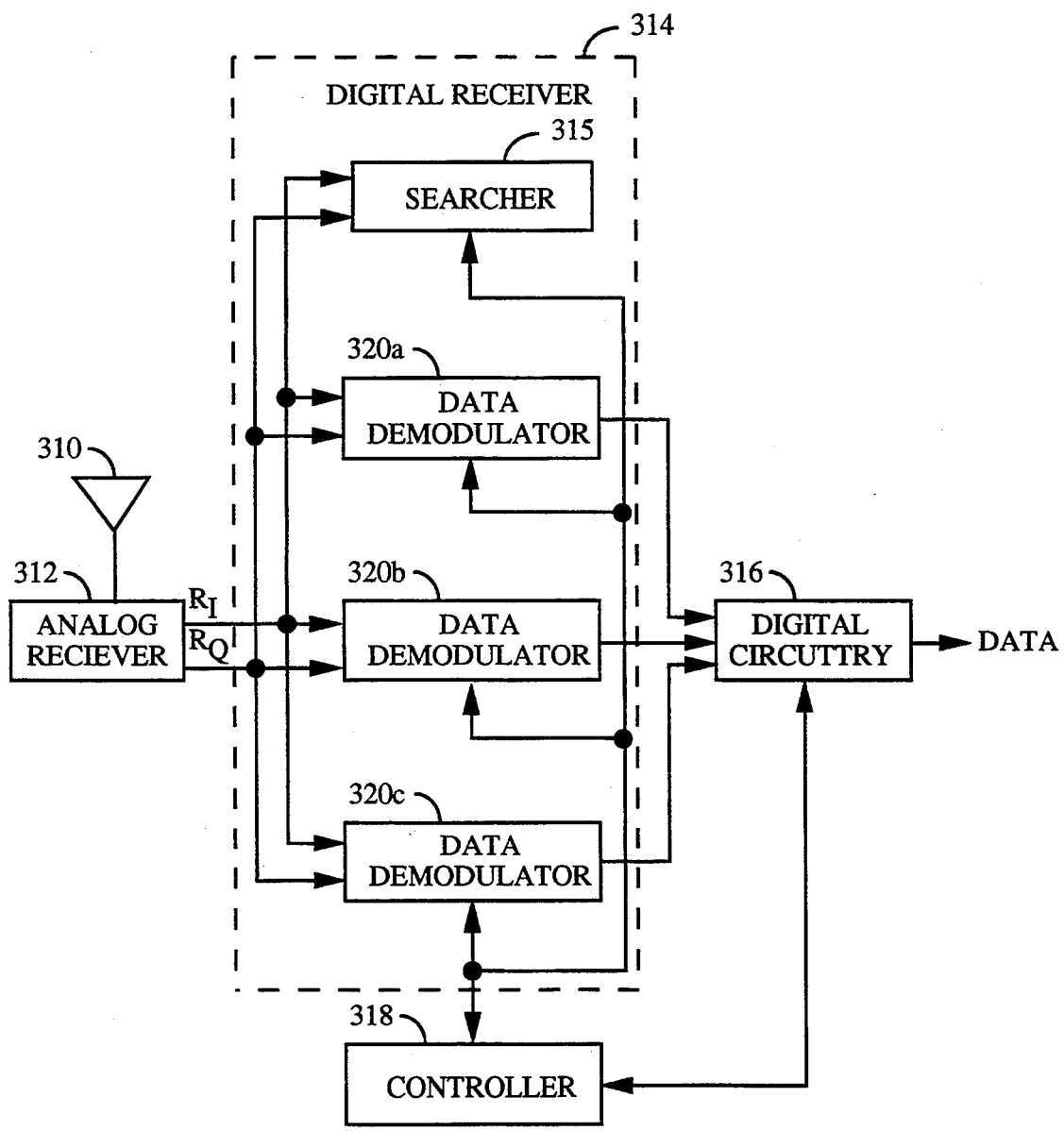
FIG. 6 is a block diagram of an exemplary diversity receiver disposed to receive the RF signal energy transmitted over the I and Q communication channels.

FIG. 6 is a block diagram of an exemplary diversity receiver disposed to receive the RF signal provided by the RF transmitter 182. In FIG. 6 the transmitted RF signal is received by antenna 310 and provided to a diversity RAKE receiver which is comprised of analog receiver 312 and digital receiver 314. The signal as received by antenna 310 and provided to analog receiver 312 may be comprised of multipath propagations of the same pilot and data signals intended for individual or multiple subscriber receivers. Analog receiver 312, which is configured in the exemplary embodiment as a QPSK modem, frequency downconverts, and digitizes the received signal into composite I and Q components. The composite I and Q components are provided to digital receiver 314 for demodulation. The demodulated data is then provided to digital circuitry 316 for combining, deinterleaving and decoding.

Each I and Q component output from analog receiver 312 may be comprised of multipath propagations of an identical pilot and corresponding data signals. In digital receiver 314 certain multipath propagations of the transmitted signal, as selected by a searcher receiver 315 in combination with a controller 318, are each processed by a different one of multiple data receivers or demodulators 320a–320c, which are also referred to as "fingers". Although only three data demodulating fingers (demodulators 320a–320c) are illustrated in FIG. 6, it should be understood that more or less fingers may be used. From the composite I and Q components each finger extracts, by despreading, the I and Q components RI and RQ of the pilot and data signals corresponding to the selected path.

The I and Q components of the pilot signal for each finger may be said to form a pilot vector, and the I and Q components of the I-channel and Q-channel data to form a pair of data vectors. In accordance with the invention, these I and Q components of the pilot and data vectors are extracted from the received signal energy in order to produce estimates of the I-channel and Q-channel data. The pilot signal is typically transmitted at a greater signal strength than the data signals, and as such the magnitude of pilot signal vector is greater than the received data signal vectors. Accordingly, the pilot signal vector can be used as an accurate phase reference for signal processing.

In the transmission process the pilot and data signals as transmitted travel the same path to the receiver. However, due to channel noise the received signal will generally be offset from the transmitted phase angle. The formulation of the dot, i.e., scalar, products of the pilot signal vector with I-channel and Q-channel data signal vectors are used as disclosed herein to extract the I-channel and Q-channel data from the signal received by the selected receiver finger. In particular, the dot product is used to find the magnitudes of the components of the data vectors that are in phase with the pilot vector by projecting the pilot vectors onto each of the data vectors. One procedure for extracting the pilot signal from the signal energy received by the selected receiver finger is described below with reference to FIG. 8, and also in copending U.S. patent application Ser. No. 07/981,034, filed Nov. 24, 1992, entitled "PILOT CARRIER DOT PRODUCT CIRCUIT", which is assigned to the assignee of the present invention, and which is herein incorporated by reference.

As noted above, in an exemplary implementation each user is assigned one of a set of a set of 64 orthogonal Walsh codes $W_i$ of length 64. This allows a set of channels including a pilot channel, 63 I-channel, and 63 Q-channels be transmitted using a given pair of spreading sequences $PN_I$ and $PN_Q$. The transmitted signal energy associated with such a full complement of channels may be expressed as:

$$S(t) = I \cos(\omega_0 t) - Q \sin(\omega_0 t); \quad (3)$$

where $$I = \sum_{i=0}^{63} a_n(i) W_i PN_I \quad (4)$$

and, $$Q = \sum_{i=0}^{63} b_n(i) W_i PN_Q. \quad (5)$$

It follows that the signal $R^k(t)$ received over a $k^{th}$ transmission path by the analog receiver 312 is given by:

$$R^k(t) = I \cos(\omega_0 t + \theta) - Q \sin(\omega_0 t + \theta) + n(t) \quad (6)$$

where the transmitted signal has a random phase shift of $\theta$ relative to the local reference of the receiver, and where n(t) denotes signal interference noise inherent within the signal $R^k(t)$. The signal $R^k(t)$ is passed through a bandpass filter within analog receiver 312 having a baseband impulse response h(−t), where h(t) denotes the impulse response of the baseband filter within transmitter 182. The filtered signals are sampled at times $t=nT_w$, where $T_w$ denotes the period between successive chips in the assigned Walsh code sequence $W_i$. These operations produce the I and Q projections $R_I^k R_Q^k$, where:

$$R_I^k = Rk(t) \cos(\omega_0 t) * h(t) |_{t=nT_w} \quad (7)$$

and, $$R_Q{}^k = -Rk(t)\sin(\omega_0 t)*h(t)|_{t=nT_w}. \qquad (8)$$

Using equation (6), the sampled projections $R^k{}_I(nT_w)$ and $R^k{}_Q(nT_w)$ are given by:

$$R_I{}^k(nT_w) = I\cos\theta - Q\sin\theta + N_i \qquad (9)$$

and, $$R_Q{}^k(nT_w) = I\sin\theta + Q\cos\theta + N_q. \qquad (10)$$

where the noise terms $N_i$ and $N_q$ may be characterized as random processes of zero mean and variance $\sigma^2$. In accordance with the invention, estimates $a_n{}^k$ and $b_n{}^k$ of the symbol streams $a_n$ and $b_n$ are derived from the sampled projections $R_I{}^k(nT_w)$ and $R_Q{}^k(nT_w)$ by the receiver finger selected to receive signals transmitted over the $k^{th}$ transmission path.

Figure 7:
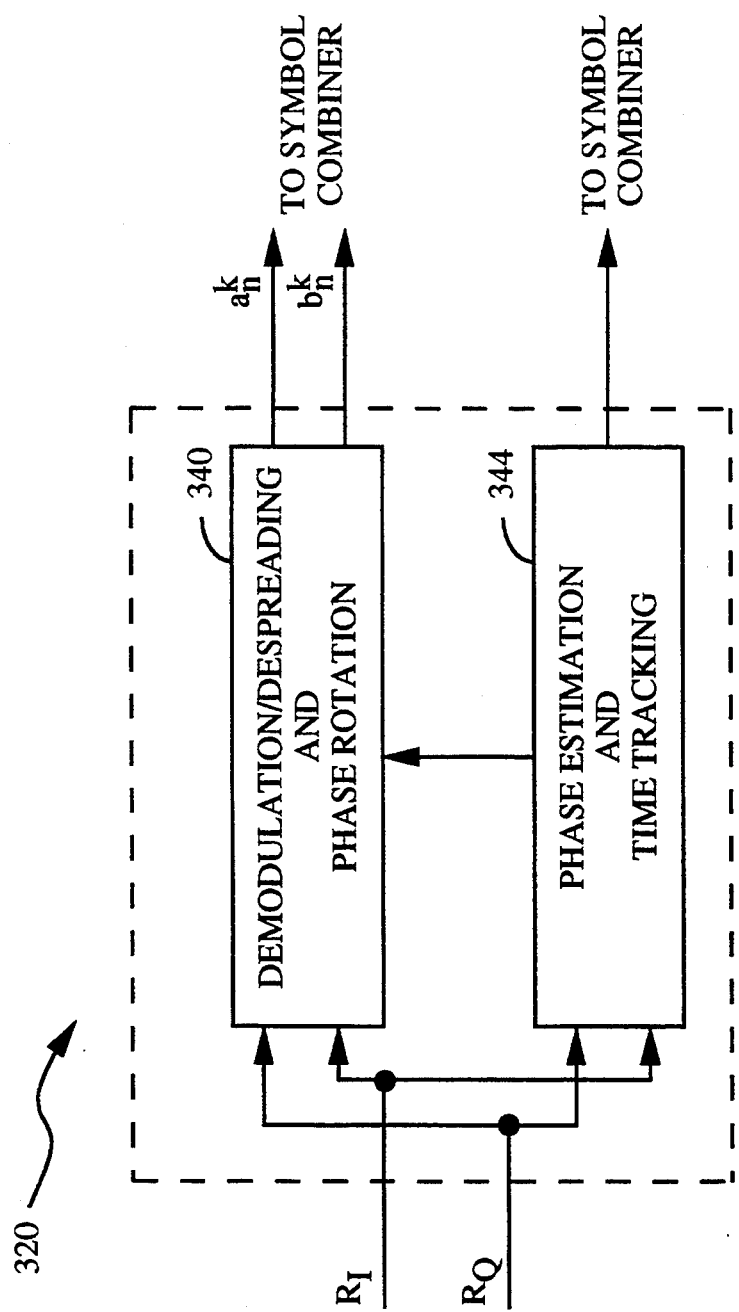
FIG. 7 is a block diagram of a receiver finger selected to process signal energy received over a selected transmission path.

Referring to FIG. 7, there is shown a block diagram of one of the receiver fingers 320 (FIG. 6) selected to process the sampled projections $R_I{}^k(nT_w)$ and $R_Q{}^k(nT_w)$ produced by the analog receiver 312. The receiver finger 320 includes a demodulation/despreading and phase rotation circuit 340, as well as a phase estimation and time tracking circuit 344. As is described in further detail below, the circuit 340 operates to demodulate the sampled projections $R_I{}^k(nT_w)$ and $R_Q{}^k(nT_w)$ using the assigned Walsh code sequence $W_i$. Following demodulation the resultant bit streams are despread using the $PN_I$ and $PN_Q$ sequences and provided to a set of correlators. The correlators are operative to produce intermediate in phase and quadrature phase projections of the data transmitted over the I and Q communication channels. The data estimates $a_n{}^k$ and $b_n{}^k$ are then generated by rotating the phase of the intermediate projections of the transmitted data in accordance with an estimated phase shift $\theta$ between the transmitted waveform and the locally-generated reference of the receiver 314. The phase estimation and time tracking circuit 344 will typically include a phase-locked loop or other circuitry suitable for generating the phase estimate $\theta$.

In a preferred embodiment the phase estimation and time tracking circuit 344 operates to provide an estimate of the pilot signal transmitted over the $k^{th}$ path on the basis of intermediate signals produced by the circuit 340 during demodulation and despreading of the sampled projections $R_I{}^k(nT_w)$ and $R_Q{}^k(nT_w)$. The extracted pilot signal is used for the phase rotation operation performed by the circuit 340, as well as for time alignment within a symbol combiner (not shown), to which is provided the estimates $a_n{}^k$ and $b_n{}^k$ of the transmitted data $a_n{}^k$ and $b_n{}^k$. Within the symbol combiner the estimates of the data transmitted over each path are time-aligned and added together, thereby improving signal to noise ratio.

Figure 8:
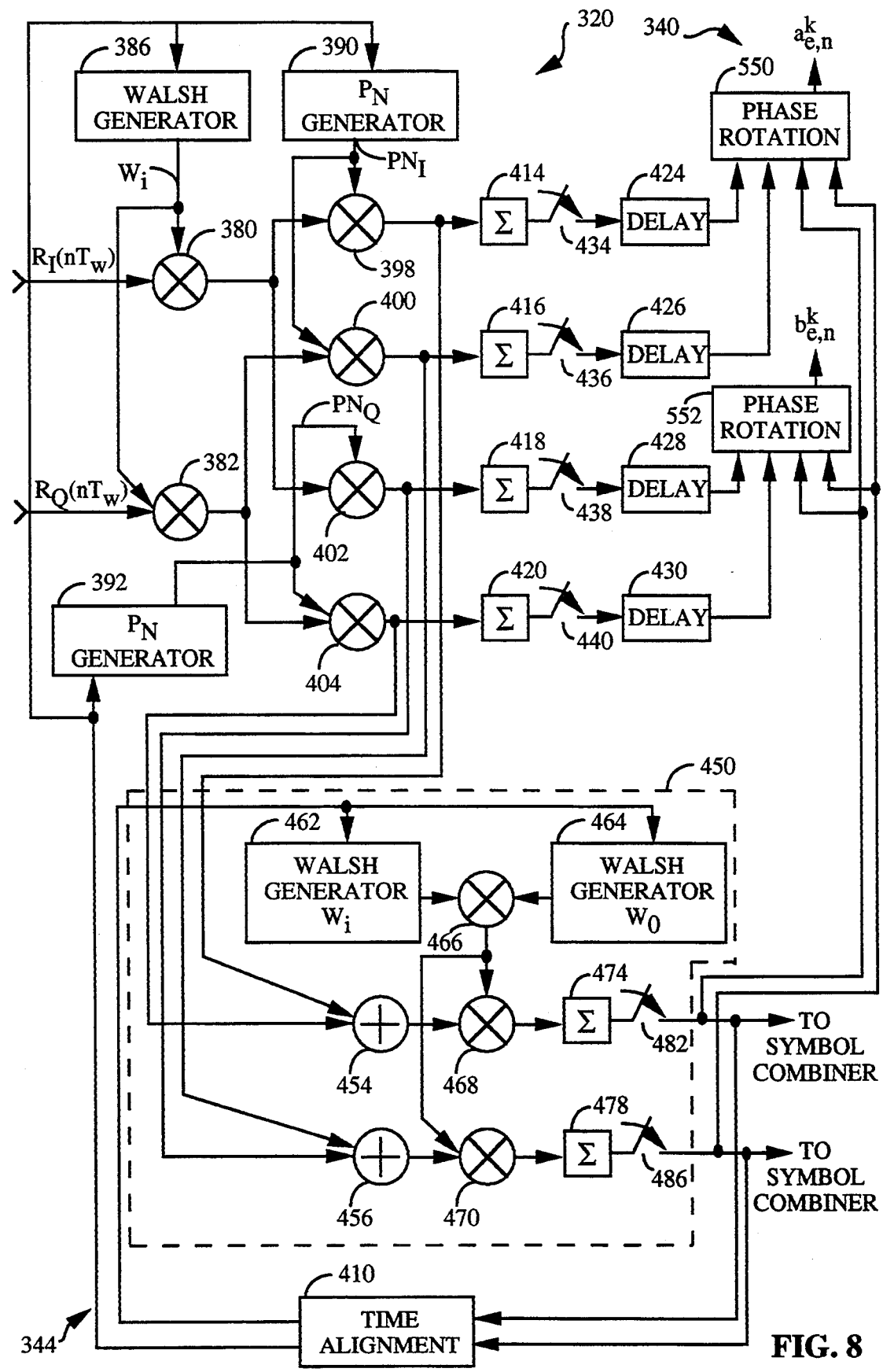
FIG. 8 provides a more detailed representation of the selected receiver finger illustrated in FIG. 7.

FIG. 8 provides a more detailed representation of the receiver finger 320 depicted in FIG. 7. As shown in FIG. 8, the circuit 340 includes multipliers 380 and 382, to which are supplied the sampled projections $R_I{}^k(nT_w)$ and $R_Q{}^k(nT_w)$ at the PN spreading rate of 1.2288 MHz. In the exemplary embodiment the logical high and low values of the binary sequences supplied to each of the multipliers shown in FIG. 8 are assumed to be $+1$ and $-1$, respectively. A Walsh generator 386 is connected to both of multipliers 380 and 382, where its output $(W_i)$ is multiplied with the projections $R_I{}^k(nT_w)$ and $R_Q{}^k(nT_w)$. The circuit 340 further includes PN generators 390 and 392 for providing the $PN_I$ sequence to multipliers 398 and 400, and the $PN_Q$ sequence to multipliers 402 and 404. As is indicated by FIG. 8, the Walsh demodulated projections $R'_I{}^k(nT_w)$ from multiplier 380 are multiplied with the $PN_I$ sequence at multiplier 398 and with the $PN_Q$ sequence at multiplier 402. Similarly, the Walsh demodulated projections $R'_Q{}^k(nT_w)$ output from multiplier 382 is multiplied with the $PN_I$ sequence at multiplier 400, and with the $PN_Q$ sequence at multiplier 404.

The multipliers 398 and 400 correlate the Walsh demodulated projections $R'_I{}^k(nT_w)$ and $R'_Q{}^k(nT_w)$ with the $PN_I$ sequence. Appropriate timing is maintained between the $PN_I$ sequence and the sequences $R'_I{}^k(nT_w)$ and $R'_Q{}^k(nT_w)$ by a time alignment circuit 410, the operation of which is discussed below. Similarly, the sequences $R'_I{}^k(nT_w)$ and $R'_Q{}^k(nT_w)$ are correlated with the $PN_Q$ sequence by multipliers 402 and 404. The correlated outputs of multipliers 398 and 400 are provided to corresponding I-channel accumulators 414 and 416, with the correlated outputs of multipliers 402 and 404 provided to corresponding Q-channel accumulators 418 and 420. Accumulators 414, 416, 418 and 420 accumulate the input information over one Walsh symbol period, $T_w$, which in the exemplary embodiment is over 64 chips. The accumulator outputs are provided to delay elements 424, 426, 428 and 430 through corresponding switches 434, 436, 438 and 440 under the control of the time alignment circuit 410. The outputs of the I-channel accumulators 414 and 416, respectively denoted as $I_I$ and $I_Q$, may be expressed as:

$$I_I(nT_w) = \sum_{j=1}^{L} R_I((Ln+j)T_w)W_j PN_I \qquad (11)$$
$$= La_n(i)\cos\theta - \sum_{j=1}^{L} Q\sin\theta W_j PN_I + n_i$$

and, $$I_Q(nT_w) = \sum_{j=1}^{L} R_Q((Ln+j)T_w)W_j PN_I \qquad (12)$$
$$= La_n(i)\sin\theta + \sum_{j=1}^{L} Q\cos\theta W_j PN_I + n_q.$$

where the noise terms $n_i$ and $n_q$ are independent random variables with zero mean and variance $L\sigma^2$, and in which it is assumed that the assigned Walsh code has a length of L Walsh chips. Similarly, the outputs $Q_I$ and $Q_Q$ of the Q-channel accumulators 428 and 430 are given by:

$$Q_I(nT_w) = \sum_{j=1}^{L} R_Q((Ln+j)T_w)W_j PN_Q \qquad (13)$$
$$= Lb_n(i)\cos\theta - \sum_{j=1}^{L} I\sin\theta W_j PN_Q + n_i$$

and, $$Q_Q(nT_w) = -\sum_{j=1}^{L} R_I((Ln+j)T_w)W_j PN_Q \qquad (14)$$
$$= Lb_n(i)\sin\theta + \sum_{j=1}^{L} I\cos\theta W_j PN_Q + n_q.$$

Referring again to FIG. 8, the phase estimation and time tracking circuit 344 includes a pilot extraction circuit 450 for producing pilot phase signals used in maintaining time alignment within the receiver finger 320. The pilot extraction circuit 450 includes an adder 454 to which is provided the outputs from multipliers 398 and 404, as well as an adder 456 for multiplying the outputs of multipliers 400 and 402. The circuit 450 further includes Walsh generators 462 and 464 operative to supply the Walsh sequences $W_i$ and $W_o$, respectively, to a multiplier 466. The resultant demodulating sequence $W_iW_o$ produced by multiplier 466, appropriately time-aligned by virtue of the timing information provided by circuit 410 to Walsh generators 462 and 464, is provided to multiplier 468 and 470. The sequence $W_iW_o$ is multiplied with the output of adder 454 by multiplier 468, while multiplier 470 performs the same operation in response to the sequence $W_iW_o$ and the output provided by adder 456.

The outputs of multiplier 468 and 470 are respectively accumulated by pilot extraction accumulators 474 and 478 over an interval selected to ensure generation of an unbiased estimate of the phase of the received pilot signal. In an exemplary embodiment the accumulation interval spans a time period of duration 2rL, where as noted above L corresponds to the Walsh symbol period. This accumulation interval will generally take place over the time periods of length "rL" occurring immediately before and after the time at which it is desired to estimate the pilot phase. Time alignment between the outputs produced by accumulators 414, 416, 418 and 420 and the outputs of pilot extraction accumulators 474 and 480 is maintained by the delay elements 424, 426, 428 and 430. The signal delay effected by each of the delay elements 424, 426, 428 and 430 is chosen to be of a duration equivalent to the interval spanned by the "r" future Walsh symbols. Accordingly, in generating the pilot estimate corresponding to the $n^{th}$ transmitted symbols $a_n$ and $b_n$ a set of data samples $S_j$, where $L(n-r)+1 \leq j \leq L(n+r)$, are accumulated by the accumulators 474 and 478. Hence, switches 482 and 486 are toggled to the closed position at a frequency of $1/LT_w$, while switches 434, 436, 438 and 440 are toggled closed at a frequency of $1/LT_w$.

The signals produced by the pilot extraction accumulators 482 and 486 correspond to I-channel and Q-channel projections of the pilot ($P_k$) signal transmitted over the $k^{th}$ path, and may be respectively represented as:

$$P_k \cdot \cos(\theta) = \sum_{n=-Lr}^{Lr} \{R_I PN_I W_0 + R_Q PN_Q W_0\} \quad (15)$$

and, $$P_k \cdot \sin(\theta) = \sum_{n=-Lr}^{Lr} \{-R_I PN_Q W_0 + R_Q PN_I W_0\}. \quad (16)$$

Referring to FIG. 8, the I-channel and Q-channel projections of the pilot signal are each provided to both the I-channel phase rotator 550 and the Q-channel phase rotator 552. The I-channel phase rotator 550 produces a sequence of output data values $a_n^k$ corresponding to an estimate of the data sequence $a_n^k(i)$ transmitted over the $k^{th}$ path weighted by the pilot signal $P_k$. The specific operation performed by the I-channel phase rotator 550 may be represented as:

$$a_n^k(i) = I_I \cdot P_k \cdot \cos(\theta) + I_Q \cdot P_k \cdot \sin(\theta) \quad (17)$$

and, $$a_n^k(i) = L \cdot P_k \cdot a_n(i)\cos(\theta - \theta) - P_k \cdot \sin(\theta - \theta) \sum_{j=1}^{L} QW_i PN_I + n' \quad (18)$$

where equation (18) is obtained from equation (17) using the trigonometric identities:

$$P_k \cdot (\cos(\theta) \cdot \cos(\theta) + \sin(\theta) \cdot \sin(\theta)) = P_k \cdot \cos(\theta - \theta) \quad (19)$$

and, $$P_k \cdot (-\cos(\theta) \cdot \sin(\theta) + \sin(\theta) \cdot \cos(\theta)) = -P_k \cdot \sin(\theta - \theta) \quad (20)$$

Inspection of equation (18) reveals that when the phase error $\alpha = (\theta - \theta)$ between the actual phase shift $\theta$ and the estimated phase $\theta$ is zero, the output data values $a_n^k(i)$ may be expressed as:

$$a_n^k(i) = L \cdot P_k \cdot a_n(i). \quad (21)$$

That is, for ideal phase estimates the data values $a_n^k(i)$ correspond to the data values $a_n^k(i)$ weighted in proportion to the strength of the transmitted pilot signal. The relative strengths of the pilot signals transmitted over the various received transmission paths are used to optimize signal to noise ratio when combining the symbols from each receiver finger 320.

As is indicated by equation (15), the presence of phase error $\alpha$ allows undesirable cross product interference from Q-channel signal energy to undesirably reduce the value of $a_n^k(i)$. This effect is minimized, however, since PN spreading attenuates the average power of the cross product interference, as represented by the second term in equation (18), by a factor of L relative to the first term. The noise term n' may be characterized as a random variable having zero mean and variance $L \cdot P_k^2 \sigma^2$.

The operation of the Q-channel phase rotator 552 may be similarly represented by the following expression:

$$b_n^k(i) = Q_I \cdot P_k \cdot \cos(\theta) + Q_Q \cdot P_k \cdot \sin(\theta) \quad (22)$$

and, $$b_n^k(i) = L \cdot P_k \cdot b_n(i)\cos(\theta - \theta) - P_k \cdot \sin(\theta - \theta) \sum_{j=1}^{L} IW_i PN_Q + n'. \quad (23)$$

where the noise term n" is a random variable having zero mean and variance $L \cdot P_k^2 \sigma^2$. Again, when the phase error $\alpha = (\theta - \theta)$ between the actual phase shift $\theta$ and the estimated phase $\theta$ is zero, the output data values $b_n^k(i)$ may be expressed as:

$$b_n^k(i) = L \cdot P_k \cdot a_n(i). \quad (24)$$

As noted above, the weighted estimates $a_n^k(i)$ and $b_n^k(i)$ of the I-channel and Q-channel data transmitted over the $k^{th}$ path are respectively combined with the $a_n^k(i)$ and $b_n^k(i)$ outputs of the remaining receiver fingers by a symbol combiner (not shown), but contained within digital circuitry 316 of FIG. 6. Since only one of the $a_n^k(i)$ or $b_n^k$ symbol streams is directed to the particular user, either an I-channel or Q-channel, only one of the symbol streams need be processed. In one exemplary implementation digital circuitry 316 includes a multiplexer or switch which in response to a select signal provides a selected output of one of the two symbol streams. Digital circuitry 316 also contains descrambling circuitry which includes a PN generator and decimator. The scrambled symbol stream is descrambled by stripping off the decimated PN code sequence, with the resultant symbols are deinterleaved within a deinterleaver contained within digital circuitry 316. The deinterleaved symbol stream is then decoded by a decoder within digital circuitry 316 and provided to the user as user data.

In an alternative implementation of the different user case both the I and Q channel data may be processed separately (descrambling, deinterleaving and decoding) with the output of the desired user data provided through a device such as a multiplexer or switch. Various other arrangements may be readily implemented as a hybrid between a single path processing and dual path processing depending upon the placement of the multiplexer in the processing path.

In the case of using the I and Q channels for different users, BPSK-type modulation is utilized in transmission of the data to each user. However, since in an exemplary implementation one-half of the total number of users are using the I-channel and the remaining users the Q-channel, the overall system may be viewed as effecting QPSK modulation and QPSK spreading.

However for the single user high data rate user uses both the I and Q channels, processing for both channels must be provided for should this high rate data communication feature be utilized.

In the case of a high data rate user the data is multiplexed, processed and transmitted over the two channels, i.e. one-half of the data is provided as an information signal over each of the I and Q channels, to allow data transmission at twice the nominal rate. Upon reception, each data demodulator 320 (FIG. 6) provides weighted estimates $a_n^k(i)$ and $b_n^k(i)$ of the I-channel and Q-channel data transmitted over the $k^{th}$ path are respectively combined with the $a_n^k(i)$ and $b_n^k(i)$ outputs of the remaining receiver fingers by a respective $a_n$ and $b_n$ symbol combiners (not shown), but contained within digital circuitry 316 of FIG. 6. In one exemplary implementation digital circuitry 316 processes the two symbol streams independently with the resultant data combined for output to the user. Digital circuitry 316 contains descrambling circuitry which includes a PN generator and decimator. The scrambled symbol stream is descrambled by stripping off the decimated PN code sequence from both symbol streams. The resultant symbols are deinterleaved in separate deinterleavers contained within digital circuitry 316. The deinterleaved symbol streams are then decoded by separate decoders within digital circuitry 316. The decoded data streams are then combined into a single data stream by a multiplexer within digital circuitry 316 and provided to the user as user data. Various other implementations may be readily derived from the above for processing of the data.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A modulation system for modulating first and second information signals for transmission in a spread spectrum communication system to first and second system user, said communication system being operative at a predefined nominal data rate, said modulation system comprising:

a PN signal generator for generating in-phase pseudorandom noise ($PN_I$) and quadrature phase pseudorandom noise ($PN_Q$) signals of predetermined PN codes;

means for generating a first orthogonal function signal of a predefined length based on said nominal data rate;

a modulation network for combining said $PN_I$ signal with said first information signal and said first orthogonal function signal to provide an I modulation signal, and for combining said $PN_Q$ signal with said second information signal and said first orthogonal function signal to provide a Q modulation signal; and a transmit modulator for modulating in-phase (I) and quadrature phase (Q) carrier signals of a predefined phase relationship with said I and Q modulation signals for transmission to said first and second system user, respectively.

2. The system of claim 1 wherein said modulation network includes a biphase modulator for modulating said first information signal with said $PN_I$ signal and with a first PN code sequence associated with said first system user, and for biphase modulating said second information signal with said $PN_Q$ signal and with a second PN code sequence different from said first PN code sequence signal.

3. The system of claim 1 wherein said means for generating said first orthogonal function signal includes means for selecting an orthogonal function from a set of orthogonal Walsh functions, and means for deriving said first orthogonal function signal based on said selected orthogonal function.

4. A modulation system for modulating an information signal of an input data rate, said information signal being transmitted on in-phase (I) and quadrature phase (Q) channels of a spread spectrum communication system using a carrier signal and a replica of said carrier signal in phase quadrature therewith, said I and Q channels being disposed to operate at a predetermined nominal data rate independent of said input data rate, comprising:

a divider circuit for dividing said information signal into first and second portions, and for encoding said first and second portions into first and second encoded signals at said predetermined nominal rate for transmission to one or more intended recipient users over said I and Q channels;

means for generating an orthogonal function signal of a predefined length based upon said nominal data rate;

a PN signal generator for generating in-phase pseudorandom noise ($PN_I$) and quadrature phase pseudorandom noise ($PN_Q$) signals of predetermined PN codes;

a modulation network for combining said $PN_I$ signal with said first portion of said information signal and said orthogonal function signal to provide an I modulation signal, and for combining said $PN_Q$ signal with said second portion of said information signal and said orthogonal function signal to provide a Q modulation signal; and a transmit modulator for modulating said carrier signal and said replica of said carrier signal with said I and Q modulation signals, respectively.

5. The system of claim 4 further including means for adding a timing control signal to said information signal, said timing control signal being indicative of signal propagation delay over said I and Q channels of said communication system.

6. The system of claim 4 wherein said modulation network includes a biphase modulator for modulating said I modulation signal with said $PN_I$ signal, and for biphase modulating said Q modulation signal with said $PN_Q$ signal.

7. A code division multiple access (CDMA) communication system for providing in-phase (I) and quadrature phase (Q) spread spectrum communication channels over which are respectively transmitted a first information signal and it second information signal different from said first information signal, comprising:

a PN generator for generating in-phase pseudorandom noise ($PN_I$) and quadrature phase pseudorandom noise ($PN_Q$) signals of predetermined PN codes;

means for generating an orthogonal function signal;

a modulation network for combining said $PN_I$ signal with said first information signal and said orthogonal function signal to provide an I modulation signal, and for combining said $PN_Q$ signal with said second information signal and said orthogonal function signal to provide a Q modulation signal;

a transmit modulator for modulating in-phase (I) and quadrature phase (Q) carrier signals of a predefined phase relationship with said I and Q modulation signals, and for transmitting said I and Q carrier signals over said I and Q communication channels, respectively; and a receiver for producing an estimate of at least said first information signal in accordance with said I and Q modulated carrier signals received over said I and Q communication channels.

8. The communication system of claim 7 wherein said receiver further includes a demodulator for demodulating said I and Q modulated carrier signals received over said I and Q communication channels into intermediate received signals using said orthogonal function signal.

9. The communication system of claim 8 wherein said receiver further includes:

means for generating a first despreading signal by replicating said $PN_I$ signal, and a first correlator for correlating said intermediate received signals using said first despreading signal in order to provide a first set of in-phase (I) and quadrature phase (Q) projection signals.

10. The communication system of claim 7 further including:

a pilot modulation network for combining said orthogonal function signal with a pilot signal in order to provide a modulated pilot signal, and means for transmitting said modulated pilot signal over a pilot channel.

11. The communication system of claim 10 wherein said receiver further includes:

a demodulator for producing an estimate of said pilot carrier signal by demodulating, using said orthogonal function signal, said modulated pilot signal transmitted over said pilot channel, and a first phase rotation circuit for generating said estimate of said information signal on the basis of said first set of said I and Q projections and said estimate of said pilot carrier signal.

12. The communication system of claim 11 wherein said receiver further includes:

means for generating a second despreading signal by replicating said $PN_Q$ signal, and a second correlator for correlating said intermediate received signals using said second despreading signal in order to provide a second set of in-phase (I) and quadrature phase (Q) projection signals.

13. The communication system of claim 12 wherein said receiver further includes a second phase rotation circuit for generating an estimate of said second information signal on the basis of said second set of I and Q projections and said estimate of said transmitted pilot carrier signal.

14. The communication system of claim 11 wherein said receiver further includes means for delaying said first set of I and Q projection signals.

15. A method for transmitting first and second information signals respectively to first and second users in a spread spectrum communication system comprising the steps of:

generating in-phase pseudorandom noise ($PN_I$) and quadrature phase pseudorandom noise ($PN_Q$) signals of predetermined PN codes;

generating a first PN code sequence associated with said first user, and a second PN code sequence associated with said second user;

generating an orthogonal function signal of predefined length;

combining said $PN_I$ signal, said first PN code sequence and said orthogonal function signal with said first information signal to provide an I modulation signal, and combining said $PN_Q$ signal, said second PN code sequence and said orthogonal function signal with said second information signal to provide a Q modulation signal; and modulating in-phase (I) and quadrature phase (Q) carrier signals of a predefined phase relationship with said I and Q modulation signals for transmission to said first and second users, respectively.

16. The method of claim 15 further including the steps of:

biphase modulating said I modulation signal with said $PN_I$ signal, and biphase modulating said Q modulation signal with said $PN_Q$ signal.

17. The method of claim 16 wherein said step of generating an orthogonal function signal includes the steps of selecting an orthogonal function from a set of orthogonal Walsh functions, and deriving said orthogonal function signal based on said selected orthogonal function.

18. The method of claim 17 further including the step of transmitting said modulated I and Q carrier signals over I and Q communication channels, respectively.

19. A method for modulating an information signal at an input data rate to be transmitted on in-phase (I) and quadrature phase (Q) channels of a spread spectrum communication system using a carrier signal and a replica of said carrier signal in phase quadrature therewith, said I and Q channels being disposed to operate at a predetermined nominal data rate independent of said input data rate, comprising:

dividing said information signal into first and second portions for transmission to one or more intended recipient users over said I and Q channels;

generating an orthogonal function signal of a predefined length independent of said input data rate;

generating in-phase pseudorandom noise ($PN_I$) and quadrature phase pseudorandom noise ($PN_Q$) signals of predetermined PN codes;

combining said $PN_I$ signal with said first portion of said information signal and said orthogonal function signal to provide an I modulation signal, and combining said $PN_Q$ signal with said second portion of said information signal and said orthogonal function signal to provide a Q modulation signal; and modulating said carrier signal and said replica of said carrier signal with said I and Q modulation signals, respectively.

20. The method of claim 19 further including the step of adding a timing control signal to said information signal, said timing control signal being indicative of signal propagation delay over said I and Q channels of said communication system.

21. The method of claim 20 further including the step of biphase modulating said I modulation signal with said $PN_I$ signal, and the step of biphase modulating said Q modulation signal with said $PN_Q$ signal.

22. In a code division multiple access (CDMA) communication system, a method for providing in-phase (I) and quadrature phase (Q) spread spectrum communication channels over which are transmitted a first information signal and a second information signal different from said first information signal, said method comprising the steps of:

generating in-phase pseudorandom noise ($PN_I$) and quadrature phase pseudorandom noise ($PN_Q$) signals of predetermined PN codes;

generating an orthogonal function signal;

combining said $PN_I$ signal with said first information signal and said orthogonal function signal to provide an I modulation signal, and combining said $PN_Q$ signal with said second information signal and said orthogonal function signal to provide a Q modulation signal;

modulating in-phase (I) and quadrature phase (Q) carrier signals of a predefined phase relationship with said I and Q modulation signals;

transmitting said I and Q carrier signals over said I and Q communication channels, respectively; and producing an estimate of at least said first information signal in accordance with said I and Q modulated carrier signals received over said I and Q communication channels.

23. The method of claim 22 further including the step of demodulating said I and Q modulated carrier signals received over said I and Q communication channels into intermediate received signals using said orthogonal function signal.

24. The method of claim 23 further including the steps of:

generating a first despreading signal by replicating said $PN_I$ signal, and correlating said intermediate received signals using said first despreading signal in order to provide a first set of in-phase (I) and quadrature phase (Q) projection signals.

25. The method of claim 22 further including the steps of:

combining said orthogonal function signal with a pilot signal in order to provide a modulated pilot signal, and transmitting said modulated pilot signal over a pilot channel.

26. The method of claim 25 further including the steps of:

demodulating said modulated pilot signal transmitted over said pilot channel, producing an estimate of said pilot signal transmitted over said pilot channel, and generating said estimate of said first information signal on the basis of said first set of said I and Q projections and said estimate of said pilot carrier signal.

27. The method of claim 26 further including the steps of:

generating a second despreading signal by replicating said $PN_Q$ signal, and correlating said intermediate received signals using said second despreading signal in order to provide a second set of in-phase (I) and quadrature phase (Q) projection signals.

28. The method of claim 27 further including the step of generating an estimate of said second information signal on the basis of said second set of I and Q projections and said estimate of said transmitted pilot carrier signal.

29. A modulation system for modulating first and second information signals for transmission in a spread spectrum communication system to first and second system users, said modulation system comprising:

a PN signal generator for generating in-phase pseudorandom noise ($PN_I$) and quadrature phase pseudorandom noise ($PN_Q$) signals of predetermined PN codes;

a code sequence generator for generating a first PN code sequence associated with said first system user, and for generating a second PN code sequence associated with said second system user;

an orthogonal function generator for generating a first orthogonal function signal of a predefined length;

a modulation network for combining said $PN_I$ signal, said first PN code sequence and said orthogonal function signal with said first information signal to provide an I modulation signal, and combining said $PN_Q$ signal, said second PN code sequence and said orthogonal function signal with said second information signal to provide a Q modulation signal; and a transmit modulator for modulating in-phase (I) and quadrature phase (Q) carrier signals of a predefined phase relationship with said I and Q modulation signals for transmission to said first and second system users, respectively.

30. A method for modulating first and second information signals for transmission in a spread spectrum communication system to first and second system users, said method comprising the steps of:

generating in-phase pseudorandom noise ($PN_I$) and quadrature phase pseudorandom noise ($PN_Q$) signals of predetermined PN codes;

generating a first PN code sequence associated with said first system user, and generating a second PN code sequence associated with said second system user;

generating a first orthogonal function signal of a predefined length;

combining said $PN_I$ signal, said first PN code sequence and said orthogonal function signal with said first information signal to provide an I modulation signal, and combining said $PN_Q$ signal, said second PN code sequence and said orthogonal function signal with said second information signal to provide a Q modulation signal; and modulating in-phase (I) and quadrature phase (Q) carrier signals of a predefined phase relationship with said I and Q modulation signals for transmission to said first and second system users, respectively.

31. A dual-mode modulation system for, during operation in a first mode, modulating first and second information signals for transmission in a spread spectrum communication system to first and second system users and for modulating, during operation in a second mode, a third information signal of an input data rate, said third information signal being transmitted on in-phase (I) and quadrature phase (Q) channels of the spread spectrum communication system using a carrier signal and a replica of said carrier signal in phase quadrature therewith, said dual-mode modulation system comprising:

a divider circuit for dividing, during operation in said second mode, said third information signal into first and second portions for transmission to one or more intended recipient users over said I and Q channels;

a PN signal generator for generating in-phase pseudorandom noise ($PN_I$) and quadrature phase pseudorandom noise ($PN_Q$) signals of predetermined PN codes;

an orthogonal function signal generator for generating a first orthogonal function signal of a predefined length based on a nominal data rate of said communication system;

a modulation network for combining said $PN_I$ signal with said first information signal and said first orthogonal function signal to provide an I modulation signal during operation in said first mode and for combining said $PN_I$ signal with said third information signal and said first orthogonal function signal to provide said I modulation signal during operation in said second mode, and for combining said $PN_Q$ signal with said second information signal and said first orthogonal function signal to provide a Q modulation signal during operation in said first mode and for combining said $PN_Q$ signal with said third information signal and said first orthogonal function signal to provide said Q modulation signal during operation in said second mode; and a transmit modulator for modulating in-phase (I) and quadrature phase (Q) carrier signals of a predefined phase relationship with said I and Q modulation signals for transmission over said I and Q communication channels, respectively.

32. A method for modulating first and second information signals for transmission in a spread spectrum communication system to first and second system users during operation of said system in a first mode, and for modulating a third information signal of an input data rate, said third information signal being transmitted on in-phase (I) and quadrature phase (Q) channels of the spread spectrum communication system during operation in a second mode using a carrier signal and a replica of said carrier signal in phase quadrature therewith, said method comprising the steps of:

dividing, during operation in said second mode, said third information signal into first and second portions for transmission to one or more intended recipient users over said I and Q channels;

generating in-phase pseudorandom noise ($PN_I$) and quadrature phase pseudorandom noise ($PN_Q$) signals of predetermined PN codes;

generating a first orthogonal function signal of a predefined length based on a nominal data rate of said communication system;

combining said $PN_I$ signal with said first information signal and said first orthogonal function signal to provide an I modulation signal during operation in said first mode and for combining said $PN_I$ signal with said third information signal and said first orthogonal function signal to provide said I modulation signal during operation in said second mode, and for combining said $PN_Q$ signal with said second information signal and said first orthogonal function signal to provide a Q modulation signal during operation in said first mode and for combining said $PN_Q$ signal with said third information signal and said first orthogonal function signal to provide said Q modulation signal during operation in said second mode; and modulating in-phase (I) and quadrature phase (Q) carrier signals of a predefined phase relationship with said I and Q modulation signals for transmission over said I and Q communication channels, respectively.

33. In a code division multiple access (CDMA) communication system for providing in-phase (I) and quadrature phase (Q) spread spectrum communication channels over which are respectively transmitted different first and second information signals using I and Q modulated carrier signals, a receiver for producing an estimate of at least said first information signal in accordance with said I and Q modulated carrier signals received over said I and Q communication channels.

34. The receiver of claim 33 further including a demodulator for demodulating said I and Q modulated carrier signals received over said I and Q communication channels into intermediate received signals using said orthogonal function signal.

35. The receiver of claim 34 further including:

a $PN_I$ signal generator for generating a first despreading signal by replicating said $PN_I$ signal, and a first correlator for correlating said intermediate received signals using said first despreading signal in order to provide a first set of in-phase (I) and quadrature phase (Q) projection signals.

36. In a code division multiple access (CDMA) communication system for providing in-phase (I) and quadrature phase (Q) spread spectrum communication channels over which are respectively transmitted different first and second information signals using I and Q modulated carrier signals, a method of receiving information transmitted over said I and Q communication channels comprising the step of producing an estimate of at least said first information signal in accordance with said I and Q modulated carrier signals received over said I and Q communication channels.

37. The method of claim 36 further including the step of demodulating said I and Q modulated carrier signals received over said I and Q communication channels into intermediate received signals using said orthogonal function signal.

38. The method of claim 37 further including the steps of:

generating a first despreading signal by replicating said $PN_I$ signal, and correlating said intermediate received signals using said first despreading signal in order to provide a first set of in-phase (I) and quadrature phase (Q) projection signals.

* * * * *